(12) United States Patent  
Manson

(10) Patent No.: US 10,135,250 B2  
(45) Date of Patent: Nov. 20, 2018

(54) INERTIA COMPENSATED LOAD TRACKING IN ELECTRICAL POWER SYSTEMS

(71) Applicant: Schweitzer Engineering Laboratories, Inc., Pullman, WA (US)

(72) Inventor: Scott M. Manson, Moscow, ID (US)

(73) Assignee: Schweitzer Engineering Laboratories, Inc., Pullman, WA (US)

( * ) Notice: Subject to any disclaimer, the term of this patent is extended or adjusted under 35 U.S.C. 154(b) by 261 days.

(21) Appl. No.: 15/164,602

(22) Filed: May 25, 2016

(65) Prior Publication Data

US 2017/0346290 A1 Nov. 30, 2017

(51) Int. Cl.
*H02J 3/46* (2006.01)
*H02J 1/10* (2006.01)
*H02J 3/38* (2006.01)
*H02J 13/00* (2006.01)

(52) U.S. Cl.
CPC ............... *H02J 3/381* (2013.01); *H02J 3/46* (2013.01); *H02J 13/0013* (2013.01); *H02J 13/0017* (2013.01)

(58) Field of Classification Search
CPC .............................. H02J 13/0017; H02J 3/381
See application file for complete search history.

(56) References Cited

U.S. PATENT DOCUMENTS

| 3,794,846 | A | * | 2/1974 | Schlicher | H02J 3/42 |
| | | | | | 307/87 |
| 4,349,744 | A | | 9/1982 | Reuther | |
| 4,387,336 | A | | 6/1983 | Joy | |
| 4,829,298 | A | | 5/1989 | Fernandes | |
| 5,006,846 | A | | 4/1991 | Granville | |
| 5,224,011 | A | | 6/1993 | Yalla | |
| 5,341,265 | A | | 8/1994 | Westrom | |
| 5,446,682 | A | | 8/1995 | Janke | |

(Continued)

OTHER PUBLICATIONS

Greg Zweigle, Expand Synchrophasor Capabilities with the Substation Phasor Data Concentrator, Feb. 18, 2010.

(Continued)

*Primary Examiner* — Alfonso Perez Borroto
*Assistant Examiner* — Esayas Yeshaw
(74) *Attorney, Agent, or Firm* — Jared L. Cherry; Richard M. Edge

(57) ABSTRACT

The present disclosure relates to systems and methods for balancing electrical generation and electrical demand in an electrical power system. In various embodiments, a controller may receive priority designations associated with a plurality of loads and inertia of a plurality of electrical generators. A trigger event analysis subsystem may detect a trigger event based on electrical conditions at a plurality of nodes within the electrical power system. A topology detection subsystem may identify a first subset of the plurality of nodes at which electrical conditions reflect the first trigger event and may associate those nodes in an electrical island. An electrical balancing system and control system may be configured to determine and eliminate an imbalance between electrical generation and electrical demand based on the combined inertia of the subset of the plurality of electrical generators and the plurality of priority designations associated with the subset of the plurality of loads.

20 Claims, 4 Drawing Sheets

(56) References Cited

U.S. PATENT DOCUMENTS

| | | | |
|---|---|---|---|
| 5,498,956 A | 3/1996 | Kinney | |
| 5,592,393 A | 1/1997 | Yalla | |
| 5,596,492 A | 1/1997 | Divan | |
| 5,693,404 A | 12/1997 | Shiraishi et al. | |
| 5,694,281 A | 12/1997 | Roberts | |
| 5,703,745 A | 12/1997 | Roberts | |
| 5,731,943 A | 3/1998 | Roberts | |
| 6,028,754 A | 2/2000 | Guzman | |
| 6,236,949 B1 | 5/2001 | Hart | |
| 6,265,881 B1 | 7/2001 | Meliopoulos | |
| 6,285,917 B1 | 9/2001 | Sekiguchi | |
| 6,341,055 B1 | 1/2002 | Guzman | |
| 6,356,421 B1 | 3/2002 | Guzman | |
| 6,356,471 B1 | 3/2002 | Fang | |
| 6,411,865 B1 | 6/2002 | Qin | |
| 6,442,010 B1 | 8/2002 | Kasztenny | |
| 6,446,682 B1 | 9/2002 | Viken | |
| 6,603,298 B2 | 8/2003 | Guzman | |
| 6,608,742 B2 | 8/2003 | Schweitzer | |
| 6,662,124 B2 | 12/2003 | Schweitzer | |
| 6,694,270 B2 | 2/2004 | Hart | |
| 6,757,146 B2 | 6/2004 | Benmouyal | |
| 6,839,210 B2 | 1/2005 | Roberts | |
| 6,845,333 B2 | 1/2005 | Anderson | |
| 6,946,753 B2 | 9/2005 | Kemahan | |
| 7,072,744 B2 | 7/2006 | Kuwabara | |
| 7,116,010 B2 | 10/2006 | Lasseter | |
| 7,196,884 B2 | 3/2007 | Guzman | |
| 7,319,576 B2 | 1/2008 | Thompson | |
| 7,356,422 B2 | 7/2008 | Schweitzer | |
| 7,457,688 B2 | 11/2008 | Szepek | |
| 7,480,580 B2 | 1/2009 | Zweigle | |
| 7,570,469 B2 | 8/2009 | Guzman | |
| 7,582,986 B2 | 9/2009 | Folkers | |
| 7,630,863 B2 | 12/2009 | Zweigle | |
| 7,635,967 B2 | 12/2009 | Loucks | |
| 7,660,088 B2 | 2/2010 | Benmouyal | |
| 7,710,693 B2 | 5/2010 | Guzman | |
| 7,761,910 B2 | 7/2010 | Ransom | |
| 7,856,327 B2 | 12/2010 | Schweitzer | |
| 7,903,381 B2 | 3/2011 | Fischer | |
| 7,930,117 B2 | 4/2011 | Guzman-Casillas | |
| 8,082,367 B2 | 12/2011 | Etheridge | |
| 8,410,633 B2 | 4/2013 | Batzler | |
| 8,560,255 B2 | 10/2013 | Elwarry | |
| 8,965,592 B2 | 2/2015 | Manson | |
| 9,008,850 B2 | 4/2015 | Manson | |
| 2004/0021470 A1 | 2/2004 | Adams | |
| 2004/0027748 A1 | 2/2004 | Kojovic | |
| 2004/0059469 A1 | 3/2004 | Hart | |
| 2004/0138834 A1 | 7/2004 | Blackett | |
| 2004/0252525 A1 | 12/2004 | Aldridge | |
| 2005/0144437 A1 | 6/2005 | Ransom | |
| 2006/0224336 A1 | 10/2006 | Petras | |
| 2006/0259255 A1 | 11/2006 | Anderson | |
| 2007/0086134 A1 | 4/2007 | Zweigle | |
| 2007/0100504 A1 | 5/2007 | Moxley | |
| 2007/0103004 A1 | 5/2007 | Chou | |
| 2007/0219755 A1 | 9/2007 | Williams | |
| 2007/0222294 A1 | 9/2007 | Tsukida | |
| 2007/0239372 A1 | 10/2007 | Schweitzer | |
| 2008/0040296 A1 | 2/2008 | Bridges | |
| 2008/0052145 A1* | 2/2008 | Kaplan | G06Q 10/0631 705/7.12 |
| 2008/0204044 A1 | 8/2008 | Ponnaluri | |
| 2008/0232005 A1 | 9/2008 | Kuehnle | |
| 2008/0281540 A1 | 11/2008 | Zweigle | |
| 2009/0021082 A1 | 1/2009 | Loucks | |
| 2009/0079266 A1 | 3/2009 | McNamara | |
| 2009/0085407 A1 | 4/2009 | Venkatasubramanian | |
| 2009/0088989 A1 | 4/2009 | Guzman | |
| 2009/0088990 A1 | 4/2009 | Schweitzer | |
| 2009/0089608 A1 | 4/2009 | Guzman | |
| 2009/0091867 A1 | 4/2009 | Guzman | |
| 2009/0099798 A1 | 4/2009 | Gong | |
| 2009/0125158 A1 | 5/2009 | Schweitzer | |
| 2009/0189445 A1* | 7/2009 | Strizki | H02J 3/382 307/21 |
| 2009/0198383 A1 | 8/2009 | Gardner | |
| 2009/0254655 A1 | 10/2009 | Kidwell | |
| 2009/0276173 A1 | 11/2009 | Wang | |
| 2010/0002348 A1 | 1/2010 | Donolo | |
| 2010/0104847 A1 | 4/2010 | Ciavatta | |
| 2010/0114390 A1 | 5/2010 | Stevenson | |
| 2010/0145536 A1 | 6/2010 | Masters | |
| 2010/0152910 A1 | 6/2010 | Taft | |
| 2010/0198423 A1 | 8/2010 | Hirst | |
| 2010/0274407 A1* | 10/2010 | Creed | H02J 3/14 700/295 |
| 2011/0004324 A1 | 1/2011 | Bickel | |
| 2011/0022734 A1 | 1/2011 | Etheridge | |
| 2011/0062708 A1 | 3/2011 | Prochaska | |
| 2011/0068576 A1 | 3/2011 | Meier | |
| 2011/0077885 A1 | 3/2011 | Zweigle | |
| 2011/0190958 A1 | 8/2011 | Hirst | |
| 2011/0213606 A1 | 9/2011 | Seaman | |
| 2011/0251732 A1 | 10/2011 | Schweitzer | |
| 2011/0298286 A1 | 12/2011 | Batzler | |
| 2012/0226386 A1 | 9/2012 | Kulathu | |
| 2013/0002032 A1* | 1/2013 | Mori | H02J 3/34 307/84 |
| 2013/0257372 A1* | 10/2013 | Chen | B60L 11/1816 320/109 |
| 2014/0354234 A1* | 12/2014 | Sudan | H02J 7/0055 320/127 |
| 2015/0244171 A1* | 8/2015 | Bartlett | H02J 4/00 307/29 |
| 2016/0254666 A1* | 9/2016 | Curtiss | H02J 3/006 700/292 |
| 2016/0285273 A1* | 9/2016 | Leinonen | H02J 3/1842 |
| 2017/0295098 A1* | 10/2017 | Watkins | H04L 47/12 |

OTHER PUBLICATIONS

Andrew Swinghamer, Create a Synchrophasor Network with the SEL-3378 Synchrophasor Vector Processor, Aug. 6, 2009.

Yanfeng Gong, Using Synchrophasor-Based Modal Analysis to Detect Unstable Power System Oscillations, Jun. 24, 2009.

Schweitzer Engineering Laboratories, Inc., Case Study, Powergrid Corporation—India, Using Wide-Area Synchrophasor Measurements to Improve System Reliability, Sep. 10, 2010.

Schweitzer Engineering Laboratories, Inc., SEL-3378 Instruction Manual, Apr. 4, 2008.

Schweitzer Engineering Laboratories, Inc., SEL-3530 Real-Time Automation Controller RTAC Instruction Manual, Sep. 15, 2009.

Terry L. Conrad, Distributed State Estimator at U.S. Virgin Islands Water and Power Authority St. Thomas and St. John, NASPI Working Group Meeting, Mar. 7, 2008.

A.P. Sakis Meliopoulos, George J. Cokkinides, Floyd Galvan, Bruce Fardanesh, Distributed State Estimator—Advances and Demonstration, Jan. 2008.

Pserc- Ali Abur andMladen Kezunovic, Sakis Meliopoulos, Enhanced State Estimation by Advanced Substation Monitoring, Power Systems Engineering Research Center, Nov. 2002.

Saman A. Zonouz and William H. Sanders, A Kalman-based Coordination for Hierarchical State Estimation: Algorithm and Analysis, Jan. 2008.

ABB: Improved Power System Performance through Wide Area Monitoring, Protection, and Control, Jan. 2004.

ABB, Wide Area Measurement, Monitoring, Protection and Control Industrial IT for Energy System Operation-, Jan. 2003.

Sasa Jakovljevic, Mladen Kezunovic, Software for Enhanced Monitoring in Integrated Substations, 2003 IEEE Bologna Power Tech Conference, Jun. 23-26, 2003.

Y. Wu, M. Kezunovic, Automatic Simulation of IED Measurements for Substation Data Integration Studies, Power Engineering Society General Meeting, Jun. 12-16, 2005.

Sasa Jakovljevic, Data Collecting and Processing for Substation Integration Enhancement, May 2003.

(56) References Cited

OTHER PUBLICATIONS

M. Kezunovic, G. Latisko, Automated Monitoring Functions for Improved Power System Operation and Control, Power Engineering Society General Meeting, Jun. 12-16, 2005.
PCT/US2011/046437 International Search Report and Written Opinion of the International Searching Authority, Patent Cooperation Treaty, dated Dec. 16, 2011.
Arshad Saleem, Agent Services for Situation Aware Control of Power Systems with Distributed Generation, 2009 IEEE [retrieved on Jan. 28, 2013 from the internet <url:http://orbit.dtu.dk/fedora/objects/orbit:55496/datastreams/file_3761170/content> ].
Chanin Choniratisai, HVDC Stability Functions and Implementation in Thailand, CEPSI 2004. [retrieved on Jan. 28, 2013 from the internet <URL://http://www.researchgate.net/CEPSI2004> ].
PCT/US2012/0068962 International Search Report and Written Opinion of the International Searching Authority, Patent Cooperation Treaty, dated Feb. 25, 2013.
G.T. Heydt, C.C. Liu, A.G. Phadke, V. Vittal, Solutions for the Crisis in Electric Power Supply, IEEE Computer Applications in Power, Jul. 2001.
Luc Meysenc, M. Jylhakallio, Peter Barbosa, Power Electronics Cooling Effectiveness Versus Thermal Inertia, IEEE Transactions on Power Electronics, vol. 20, No. 3, May 2005.
R.A. Walling, N.W. Miller, Distributed Generation Islanding—Implications on Power System Dynamic Performance, IEEE Power Enginnering Society Summer Meeting vol. 1, Jul. 25, 2002.
M. Ezzt, M.I. Marei, M. Abdel-Rahman, M.M. Mansour, A Hybrid Strategy for Distributed Generators Islanding Detection, IEEE PES Power Africa 2007 Conference and Exposition Johannesburg, South Africa, May 16-20, 2007.
Mats Larsson, Christian Rehtanz, Predictive Frequency Stability Control Based on Wide-Area Phasor Measurements, IEEE Power Engineering Society Summer Meeting vol. 1, Jul. 2002.
Jun Yin, Liuchen Chang, Chris Diduch, Recent Developments in Islanding Detection for Distributed Power Generation, IEEE Power Engineering, Jul. 2004.
Xiaoming Wang, Vijay Vittal, System Islanding Using Minimal Cutsets with Minimum Net Flow, IEEE Power Systems Conference and Exposition, Oct. 2004.
Dongchen Hu, Vaithianathan Venkatasubramanian, New Wide Area Algorithms for Detection and Mitigation of Angle Instability Using Synchrophasors, IEEE Power Engineering Society General Meeting, Jun. 2007.
Robert J. Best, D. John Morrow, David J. Mcgowan, Peter A. Crossley, Synchronous Islanded Operation of a Diesel Generator, IEEE Transactions on Power Systems, vol. 22, No. 4, Nov. 2007.
Olof Samuelsson, Helga Johannsdottir, Nils Gustavsson, Thorhallur Hrafnsson, Daniel Karlsson, Mike Kockott, Johan Salj, Arve Sollie, Power System Damping in Iceland Based on Phasor Measurements, Jul. 2, 2006.
Gabriel Benmouyal, E. O. Schweitzer, A. Guzman, Synchronized Phasor Measurement in Protective Relays for Protection, Control, and Analysis of Electric Power Systems, 29th Annual Western Protective Relay Conference, Oct. 22-24, 2002.
A.G. Phadke, Synchronized Phasor Measurement in Power Systems, IEEE Comput. Appl., vol. 6, No. 2, pp. 10-15, Apr. 1993.
Edmund O. Schweitzer, III, David Whitehead, Armando Guzman, Yanfeng Gong, Marcos Donolo, Advanced Real-Time Synchrophasor Applications, Western Protective Relay Conference, Oct. 2008.
Dale Williston, Dale Finney, Consequences of Out-of-Phase Reclosing on Feeders with Distributed Generators, Dec. 3, 2010.
Michael J. Thompson, Fundamentals and Advancements in Generator Synchronizing Systems, Dec. 9, 2010.
Michael J. Thompson, New Developments in Generator Synchronizing Systems, Feb. 10, 2011.
PCT/US2012/055107 Patent Cooperation Treaty, International Search Report and Written Opinion of the International Searching Authority, dated Nov. 23, 2012.

* cited by examiner

INERTIA COMPENSATED LOAD TRACKING IN ELECTRICAL POWER SYSTEMS

TECHNICAL FIELD

This disclosure relates to systems and methods for inertia compensation and load tracking in electric power systems for balancing electrical generation and electrical loads in such systems. More particularly, but not exclusively, the systems and methods may identify trigger events observed by a plurality of electrical nodes and may utilize the identified trigger events to assess the topology of an electrical system.

BRIEF DESCRIPTION OF THE DRAWINGS

Non-limiting and non-exhaustive embodiments of the disclosure are described, including various embodiments of the disclosure with reference to the figures included in the detailed description.

DETAILED DESCRIPTION

Figure 1:
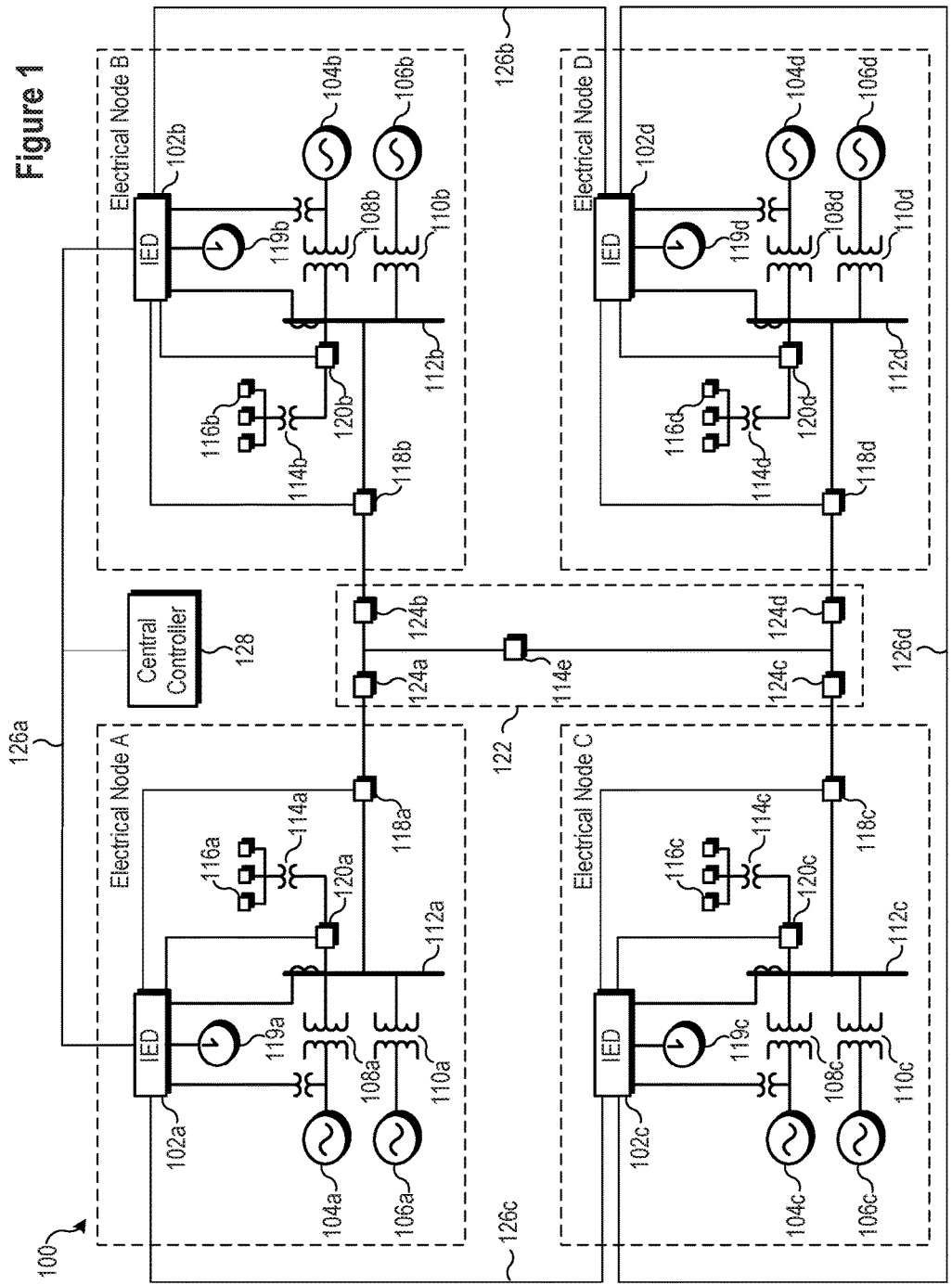
FIG. 1 illustrates a one line diagram of including a four interconnected electrical system consistent with embodiments of the present disclosure.

The present disclosure pertains to systems and methods for monitoring and controlling an electrical power system. In various embodiments, the systems and methods of the present disclosure may be utilized to monitor the topology of an electrical power system and balancing generation and load demands in the system based on the topology.

The systems of the present disclosure may realize various advantages by coordinating the balancing of electrical generation and load across interconnected electrical power systems. Power unbalances of power supply versus load in electrical power systems may result in disruptions in electrical service. Disruptions may adversely affect users of such systems, including users whose safety may depend on reliable operation of an electrical power system, such as ships, refineries, mines, industrial processes, military installations, etc. The teachings of the present disclosure may be utilized in various embodiments to track the topology of an electrical power system and to adjust electrical power generation and electrical load to maintain the stability of the power system. Further, certain embodiments disclosed herein may be implemented using existing infrastructure.

One method for detecting power imbalances involves detecting a fall or rise in the frequency of the power system voltage. The crossing of an under frequency or over frequency threshold in an electrical power system may trigger the shedding of loads or generators to rebalance the electrical power system. In various embodiments, load-shedding determinations may be based on various factors, including system topology, the total inertia of electrically connected portions of the electric power system, and the frequency rate of change. Such systems may be referred to as inertia compensation and load-tracking ("ICLT") systems. The inertia of the system is determined by the combined properties of the electrically connected connects that make up the electrical power system.

Rotating inertia, J, is the effect of mass spinning at a radius. The inertia of a rotating system and may be described using Eq. 1.

$$J = \text{Mass} * \text{Radius of Rotation squared}, \qquad \text{Eq. 1}$$

where
  J is expressed in units of kg–m$^2$
  Mass is expressed in kilograms; and
  Radius of Rotation squared is express in meters squared.

The inertia of a rotating electric power system device (e.g., a generator, a motor, a turbine, etc.) may be described using Eq. 2.

$$H = \frac{J * \omega_{om}^2}{2 * VA_{rating}}, \qquad \text{Eq. 2}$$

where
  H is expressed seconds,
  $\omega_{om}$ is the rated machine speed in radians per second
  $VA_{rating}$ is the total rating of the device.

H may be used to describe the relationship between generator speed, the mechanical power from a turbine, and the electric power out of a generator according to Eq. 3.

$$2H\omega \frac{d\omega}{dt} = P_m - P_{elec} = P_{acc}, \qquad \text{Eq. 3}$$

where
  $\omega$ is the generator speed expressed in pu of the rated speed;
  $P_m$ is the mechanical power out of a turbine (in pu);
  $P_{elec}$ is the electric power out of a generator (in pu);
  $P_{acc}$ is the acceleration power of the combined turbine and generator system.

For a generator and turbine combination, H becomes the time (in seconds) required for a machine to change 1 pu speed given full mechanical power from the turbine and a short-circuit condition on the generator terminals. Short-circuited generators supply no electric power, and thus the generator and turbine rotational speed (and hence electric frequency) accelerates. Considerations may be made in any inertia calculation to include generator pole count and mechanical gearing between a turbine and generator (such as is common in some microturbines). Eq. 3 identifies the general power balance equation that must be satisfied by any load-shedding system. After an event, an optimal load-and/or generation-shedding system will trip enough load or generation such that the $P_{acc}$ term is equal to near zero.

In certain scenarios, the determination of the inertia and the loads in an electrical power systems are relatively straightforward (e.g., an industrial facility with a single owner and one point of interconnect to a utility); however, the inventors of the present application have realized that certain advantages may be realized by incorporating certain principles utilized by ICLT systems into larger-scale electrical power systems. Accordingly, various embodiments disclosed herein may be utilized to address complicated boundaries and multiple points of power interconnection that may be typical in electrical utility systems.

Under certain conditions, typically interconnected electrical nodes may separate into isolated electrical islands. Accordingly, a system for balancing electrical power generation and loads may track the topology of the electrical power system. Such tracking may help to ensure that actions to rebalance an electrical system are effective (e.g., ensuring that loads to be shed are electrically connected to power generators that are delivering insufficient power).

The embodiments of the disclosure will be best understood by reference to the drawings. It will be readily understood that the components of the disclosed embodiments, as generally described and illustrated in the figures herein, could be arranged and designed in a wide variety of different configurations. Thus, the following detailed description of the embodiments of the systems and methods of the disclosure is not intended to limit the scope of the disclosure, as claimed, but is merely representative of possible embodiments of the disclosure. In addition, the steps of a method do not necessarily need to be executed in any specific order, or even sequentially, nor need the steps be executed only once, unless otherwise specified.

In some cases, well-known features, structures or operations are not shown or described in detail. Furthermore, the described features, structures, or operations may be combined in any suitable manner in one or more embodiments. It will also be readily understood that the components of the embodiments as generally described and illustrated in the figures herein could be arranged and designed in a wide variety of different configurations.

Several aspects of the embodiments described may be implemented as software modules or components. As used herein, a software module or component may include any type of computer instruction or computer executable code located within a memory device and/or transmitted as electronic signals over a system bus or wired or wireless network. A software module or component may, for instance, comprise one or more physical or logical blocks of computer instructions, which may be organized as a routine, program, object, component, data structure, etc., that performs one or more tasks or implements particular abstract data types.

In certain embodiments, a particular software module or component may comprise disparate instructions stored in different locations of a memory device, which together implement the described functionality of the module. Indeed, a module or component may comprise a single instruction or many instructions, and may be distributed over several different code segments, among different programs, and across several memory devices. Some embodiments may be practiced in a distributed computing environment where tasks are performed by a remote processing device linked through a communications network. In a distributed computing environment, software modules or components may be located in local and/or remote memory storage devices. In addition, data being tied or rendered together in a database record may be resident in the same memory device, or across several memory devices, and may be linked together in fields of a record in a database across a network.

Embodiments may be provided as a computer program product including a non-transitory computer and/or machine-readable medium having stored thereon instructions that may be used to program a computer (or other electronic device) to perform processes described herein. For example, a non-transitory computer-readable medium may store instructions that, when executed by a processor of a computer system, cause the processor to perform certain methods disclosed herein. The non-transitory computer-readable medium may include, but is not limited to, hard drives, floppy diskettes, optical disks, CD-ROMs, DVD-ROMs, ROMs, RAMs, EPROMs, EEPROMs, magnetic or optical cards, solid-state memory devices, or other types of machine-readable media suitable for storing electronic and/or processor executable instructions.

FIG. 1 illustrates a one line diagram of a system 100 including four interconnected electrical nodes consistent with embodiments of the present disclosure. In each of electrical nodes A, B, C, and D, IEDs 102a-d is configured to monitor and control the operation of a respective electrical subsystem. Electrical nodes A, B, C, and D may be configured to generate, transmit, and distribute electric energy to loads. Each electrical node A-D include equipment, such as electric generators (e.g., generators 104a-d, 106a-d), power transformers (e.g., transformers 108a-d, 110a-d), circuit breakers (e.g., breakers 118a-d, 120-a-d), busses (e.g., busses 112a-d), loads (e.g., loads 116a-d) and the like, and may be able to operate when electrically isolated from the other electrical nodes. A variety of other types of equipment may also be included in electrical subsystems A-D, such as voltage regulators, capacitor banks, and other types of equipment.

An interconnection system 122 between the electrical nodes A-D may be selectively interconnected by a plurality of breakers 124a-e in the interconnection system 122. The status of the breakers 124a-e may not necessarily be available to communicate to a control system associated with the respective electrical nodes (e.g., IEDs 102a-d). In view of the lack of information relating to deterministic information about the status of interconnection system 122, the IEDs 102a-d may be configured to utilize various techniques disclosed herein to determine which electrical nodes are electrically connected and which are electrically isolated.

Electrical nodes A-D, may be monitored, controlled, automated, and/or protected using intelligent electronic devices (IEDs), such as IEDs 102a-d. In general, IEDs in an electric power generation and transmission system may be used for protection, control, automation, and/or monitoring of equipment in the system. For example, IEDs may be used to monitor equipment of many types, including electric transmission lines, electric distribution lines, current transformers, busses, switches, circuit breakers, reclosers, transformers, autotransformers, tap changers, voltage regulators, capacitor banks, generators, motors, pumps, compressors, valves, and a variety of other types of monitored equipment.

In the illustrated embodiment, IEDs 102a-d are configured to monitor the output of generators 104a-d, 106a-d, respectively, and a voltage of an electrical bus 112a-d, respectively. An IED (such as IEDs 102a-d) may be embodied by any microprocessor-based device that monitors, controls, automates, and/or protects monitored equipment within system 100. Such devices may include, for example, remote terminal units, differential relays, distance relays, directional relays, feeder relays, overcurrent relays, voltage regulator controls, voltage relays, breaker failure relays, generator relays, motor relays, automation controllers, bay controllers, meters, recloser controls, communications processors, computing platforms, programmable logic controllers (PLCs), programmable automation controllers, input and output modules, and the like. The term IED may be used to describe an individual IED or a system comprising multiple IEDs. IEDs 102a-d may be configured to control breakers 118a-d and 12a-d. Breakers 118a-d may be used to selectively connect or disconnect loads 116a-d, respectively. Breakers 118a-d may be configured to connect or disconnect a respective electrical subsystem to one or more of the other electrical subsystems.

IEDs 102a-d may utilize communication lines 126a-d to communicate information that may be utilized to track topology of system 100 and to coordinate balancing of generation and load within the system. The communication lines 126a-d may utilize a variety of devices (e.g., multiplexers, routers, hubs, gateways, firewalls, switches, etc.) and communication technologies. In some embodiments, the communication lines 126a-d may comprise contact inputs, Ethernet ports, RS-232 ports and other technologies.

IEDs 102a-d may be in communication with a respective time source 119a-d. In some embodiments, time sources 119a-d may each be configured to receive a common time reference. In various embodiments, time sources 119a-d may comprise a GNSS receiver, IRIG-B receiver, a WWVB or WWV receiver and the like. In certain embodiments, a common time reference may be received via communication lines 126a-d, and in such embodiments, a separate time source may not be required for time-stamping and/or synchronization operations. In some embodiments, time sources 119a-d may be configured to maintain synchronization to within 1 millisecond of accuracy.

In various embodiments, IEDs 102a-d may be configured to exchange information that may be used to identify nodes within system 100 that are electrically connected. Still further, IEDs 102a-d may exchange information relating to the inertia of each electrical node. The inertia information may be used to determine a total measurement of inertia of all electrically connected nodes. In various embodiments, the inertia information may be provided by a user. In the event that conditions necessitate load or generation shedding, IEDs 102a-d may utilize such information to optimize the load or generation shedding for various characteristics. Such characteristics may include maintaining high-priority loads, minimizing the number of customers affected by the shedding, maximizing revenue based on terms of commercial contracts, etc. The priority of the loads may be specified by a user.

In various embodiments, communication lines 126a-d may be embodied as low-bandwidth communication channels. For example, the communication lines 126a-d may be embodied as 19,200 baud serial communications over multiplexed channels. In other embodiments, communication lines 126 a-d may communicate using faster or slower data speeds. In another specific embodiment, the communication lines may enable IEDs 102a-d to pass information relating to load shedding within 2 to 4 milliseconds. The requirements of this specific example may be satisfied by embodying IEDs 102a-d using SEL-451 relays available from Schweitzer Engineering Laboratories, of Pullman Wash. In one specific embodiment, communication among the relays may be performed using the IEC-61850 GOOSE communication protocol. A variety of protocols may be utilized in other embodiments.

The topology of system 100 may change in response to events and conditions within system 100. Accordingly, determining the topology of system 100 may involve an ongoing process. When an IED detects a change in the topology, the change may be communicated to other controllers to determine the total inertia and power disparity of the resulting configuration. As such, the IEDs may have sufficient information to balance generation and load, and if necessary determine adjustments to the load or generation of the system.

In various embodiments, IEDs 102a-d may be configured to detect certain trigger conditions and to communicate the detection of such conditions to the other IEDs. In one embodiment, the trigger condition may comprise a deviation from a nominal frequency. For example, in an embodiment that monitors changes in a system frequency, a deviation of ±0.5 Hz from the nominal frequency may be associated with a first trigger, a deviation of ±1.0 Hz from the nominal frequency may be associated with a second trigger, and a deviation of 1.5 Hz from the nominal frequency may be associated with a third trigger. If two or more IEDs observe a first trigger and a second trigger that exceed one or more of the first, second, or third triggers, it may be presumed that the segments of the power system associated with the IEDs are electrically connected. In other embodiments, the trigger condition may comprise a phase angle. In such embodiments, the IEDs 104a-d may be configured to compare observed phase angles. One or more trigger events based on deviations in a phase angle observed by an IED may be communications to other IEDs. IEDs observing one or more of the same trigger events may be determined to be electrically connected. In addition to monitoring frequency or phase angle, the trigger conditions may be based on other electrical parameters. For example, a rate of change of frequency or a rate of change of a phase angle may be analyzed to detect a trigger conditions.

In some embodiments, a central controller 128 may be provided. In the illustrated embodiment, the central controller 128 may receive information from the IEDs 102a-d. The information may receive various types of information associated with the generators, loads, and operating conditions in system 100. In one specific embodiment, one or more users may provide inertia of a plurality of the electrical generators 104a-d, 106a-d, and priorities of loads 116a-d. Central controller 128 may further receive information relating to operating conditions of system 100, such as measurements of frequency or phase angle. The central controller 128 may monitor such measurements to detect trigger events. Trigger events may be used it determine which of electrical nodes A-D are electrically connected. More specifically, central controller 128 may identify which of electrical nodes A-D reflect the first trigger event based on operating conditions. The electrical nodes that reflect the first trigger event may be associated in an electrical island. In some embodiments, multiple trigger events may be required before nodes are associated in the same electrical island. The information regarding topology, generator inertia, and electrical power consumption may be used by an electrical balancing subsystem to determine an imbalance between electrical generation and electrical demand in the island. Appropriate control actions may then be implemented to increase or decrease generation, or to decrease or decrease electrical load to eliminate the imbalance. In the case where electrical load is shed to eliminate the imbalance, the priorities associated with the loads may be utilized to maintain high priority loads.

Figure 2:
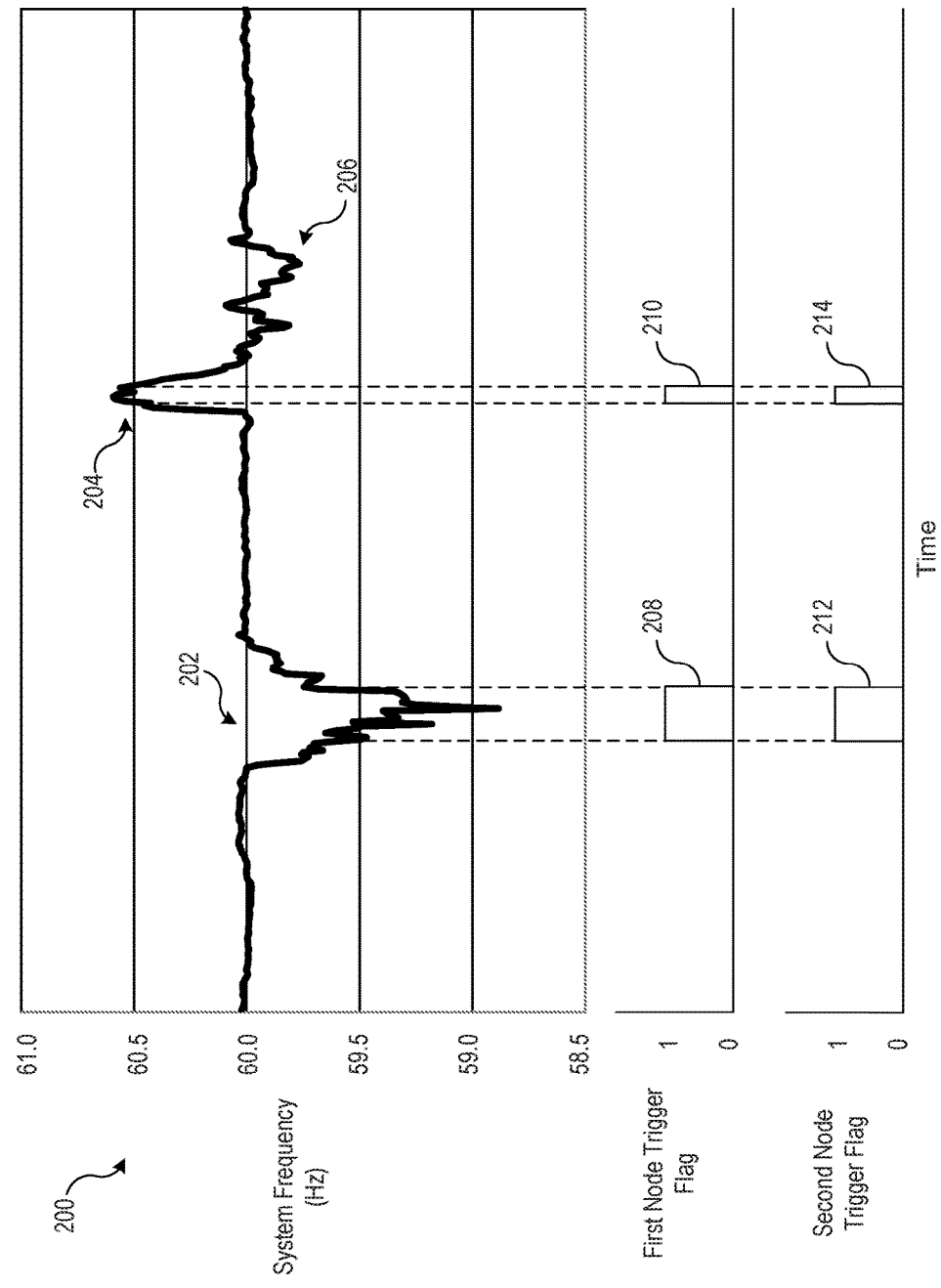
FIG. 2 illustrates a frequency plot over time of an electrical power system frequency trigger conditions and a plot over time of signal generated by a first node and a second node in response to the trigger conditions consistent with embodiments of the present disclosure.

FIG. 2 illustrates a plot 200 of frequency of an electrical power system having a fundamental frequency of 60 Hz consistent with embodiments of the present disclosure. The plot 200 includes triggers that may be analyzed in connection with a topology monitoring system. The illustrated plot 200 includes several triggers that may be observed by an IED associated with a particular node in an electrical power system. The probability that electrically isolated islands will exhibit the same frequency response is remote. Associating the frequency response with a specific time interval, or utilizing multiple trigger conditions to determine topology may ensure confidence in the proper allocation of specific nodes within the electrical power system.

Several thresholds are indicated on plot 200 at 0.5 Hz increments. In alternative embodiments, thresholds separated by other increments may be utilized. Frequency measurements that exceed one of the thresholds may comprise a trigger that may be analyzed to identify electrically connected nodes. Where one or more specific triggers are measured at two electrical nodes, a topology system may determine that the two nodes are electrically connected. In some embodiments, a greater deviation may be associated with a greater confidence in the association of two or more electrical nodes that observe the same trigger.

A first trigger 202 comprises an under frequency event. In various embodiments, the deviation may be reduced by load shedding. As the generation and load in the system is rebalanced, the frequency may stabilize at the nominal frequency of 60 Hz. In one embodiment, a first IED may monitor a first electrical node and a second IED may monitor a second electrical node. The first IED and the second IED may each assert a trigger flag 208 and 212, respectively, in response to the first trigger 202. The trigger flags 208 and 212 may be communicated to a plurality of other IEDs. IEDs that assert a trigger flag during the first trigger 202 may be considered to be part of the same electrical island by a topology system. In other embodiments, various types of additional information regarding the disturbance may be communicated. For example, in some embodiments, the severity of the deviation may be communicated; in other embodiments duration of the deviation may be communicated.

A second trigger at 204 shown in the illustrated embodiment comprises an over frequency event. The frequency of an electrical power system may increase in response to excess generation. The deviation may be reduced by generation shedding. When the frequency exceeds the threshold of 60.5 Hz, the first node trigger flag and the second node trigger flag may be asserted. In some embodiments, a topology system may require that two or more trigger events be observed at electrical nodes before the nodes are associated in an electrical island.

In some embodiments, deviations from a nominal frequency that are below a specified threshold may not be considered for topology analysis. For example, the deviation shown at 206 remains between 0.5±60 Hz, and as such, may not be analyzed for purposes of determining topology. In some embodiments, IEDs monitoring the first node and the second node may not assert the trigger flags in response to the deviation shown at 206.

Figure 3:
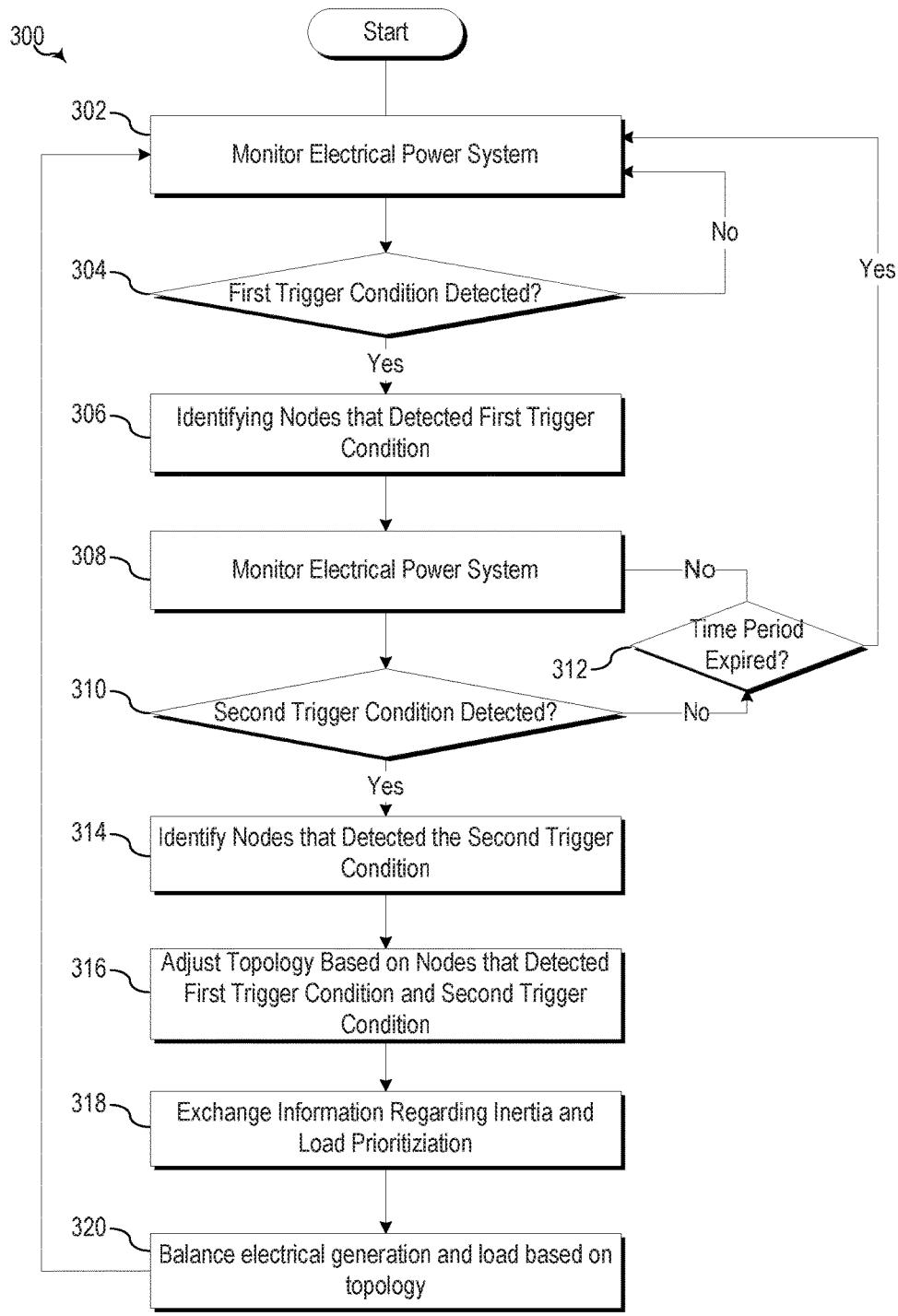
FIG. 3 illustrates a flow chart of a method for determining a topology of a plurality of electrical nodes based on a first trigger condition and a second trigger condition and balancing electrical generation and electrical load using the topology condition consistent with the present disclosure.

FIG. 3 illustrates a flow chart of a method 300 for determining a topology of a plurality of electrical nodes based on a first trigger condition and a second trigger condition and balancing electrical generation and electrical load using the topology condition consistent with the present disclosure. At 302, an electrical power system may be monitored. In various embodiments, a plurality of IEDs may be configured to monitor a plurality of nodes in the electric power system. Monitoring the electrical power at 302 may continue until a first trigger condition is detected at 304.

Method 300 may determine at 304 whether a first trigger condition has been detected. In various embodiments, the trigger condition may comprise a deviation in frequency, a deviation of an angle, or other electrical parameter. The trigger condition may be detected by a plurality of individual IEDs, and each IED may be configured to communicate the detection of the trigger to one or more other IEDs.

At 306, a plurality of nodes may be identified that detected the first trigger condition. In some embodiments, a plurality of IEDs that detect the first trigger may communicate detection of the first trigger in various ways. In one specific embodiment, each IED in the system may be configured to assert a flag upon the occurrence of a trigger event. The contemporaneous assertion of flags from various IEDs may comprise identification of the nodes that detected the first trigger condition.

In the illustrated embodiment, after detection of the first trigger monitoring of the electrical power system may continue at 308. Monitoring at 308 may be similar to the monitoring at 302. At 310, method 300 may determine whether a second trigger condition has been detected. In some embodiments, the second trigger condition may comprise any of the same conditions as the first trigger condition. In other embodiments, the second trigger condition may comprise a different type of condition. For example, if the first trigger condition comprises a deviation in the frequency of an electrical system from a nominal frequency, the second trigger condition may comprise a phase angle measurement.

At 312, method 300 may determine whether a time period has expired. In some embodiments, a time constraint may be imposed between the occurrence of the first trigger condition and the second trigger condition. In other embodiments, criteria other than time may be imposed to associate the first trigger condition and the second trigger condition.

Upon detection of the second trigger, at 314, nodes that detected the second trigger condition may be identified. In some embodiments, identification of nodes that detected the second trigger condition may utilize the same techniques that are utilized to detect the first trigger condition.

At 316, a topology may be adjusted based on nodes that detected the first trigger condition and the second trigger condition. More particularly, the nodes that detected the first trigger condition and the second trigger condition may be associated in the same electrical island.

At 318, information may be exchanged among controllers within the same electrical island regarding inertia associated with generation sources, power consumption, and priority of loads in the island. In some embodiments, this information may be used to determine a power disparity and to derive appropriate control actions to remedy the disparity.

At 320, electrical generation and load may be balanced within an electrical island. In various embodiments and circumstances, a balance between electrical generation and load may be achieved by implementing one or more control actions, such as shedding load, increasing generation capacity, decreasing generation capacity, reducing voltage, adding reactive power support, etc.

Figure 4:
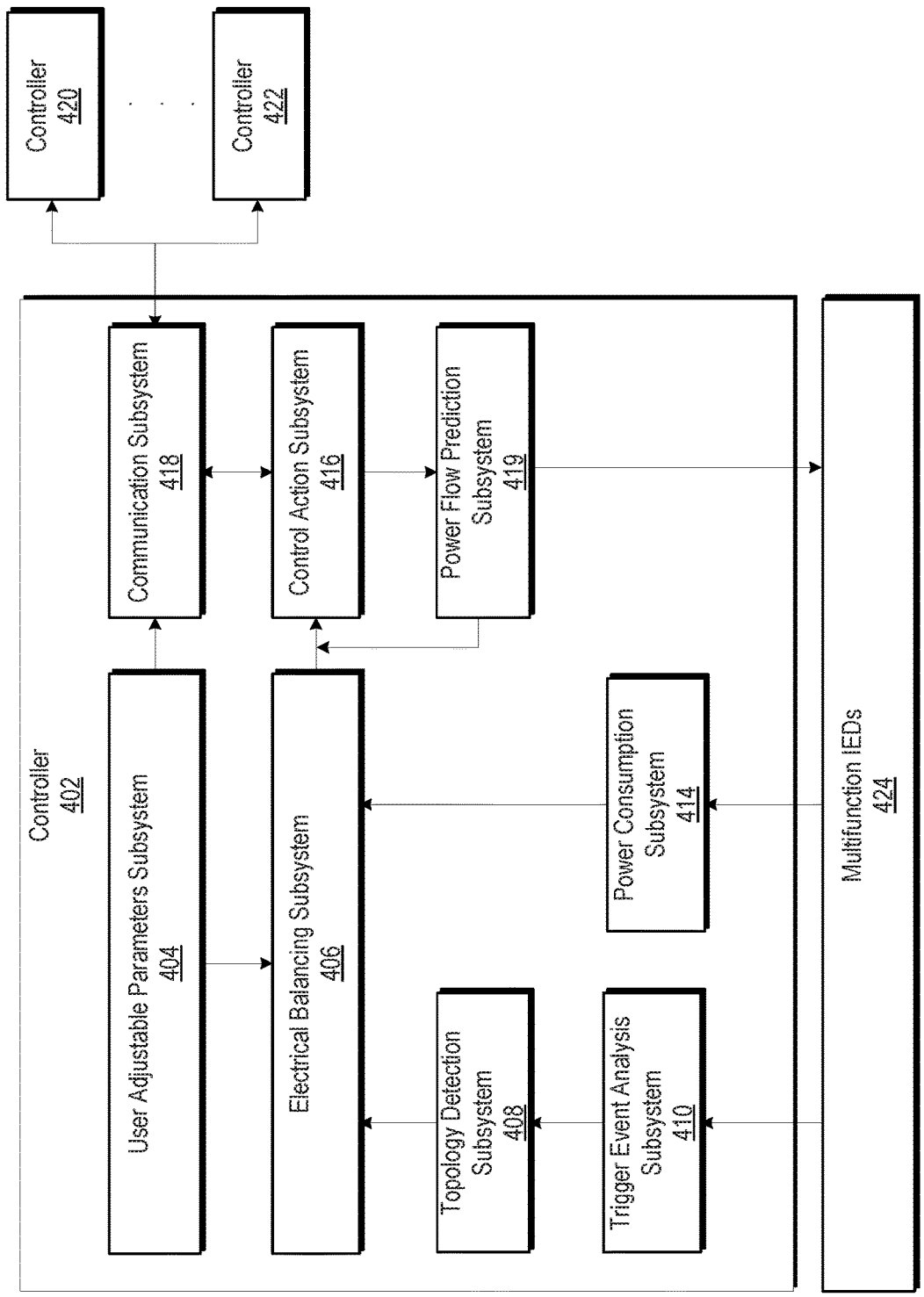
FIG. 4 illustrates a conceptual representation of information flow within a system including a centralized controller and a plurality of multifunction IEDs consistent with embodiments of the present disclosure.

FIG. 4 illustrates a conceptual representation of information flow within a system including a controller 402 and a plurality of multifunction IEDs 424 consistent with embodiments of the present disclosure. The controller 402 and the multifunction IEDs 424 are configured to exchange information that may be used to determine a topology of an electrical power system and to balance electrical generation and loads. Controller 402 may comprise a user adjustable parameters subsystem 404. In some embodiments, such user adjustable parameters may include an inertia of generation sources and load priority tables. In other embodiments, additional parameters may be specified. In some embodiments, the user adjustable parameters may be used to balance electrical generation and load by decreasing load through load shedding.

The multifunction IEDs 424 may provide various types of information to controller 402, such as frequency, phase, detection of trigger events, power consumption, load status, etc. The multifunction IEDs 424 may be associated with electrical nodes in distinct electrical islands. The information provided by multifunction IEDs 124 may be utilized by trigger event analysis subsystem 410 to identify IEDs detecting coinciding trigger events. In various embodiments, IEDs detected coinciding trigger events (e.g., frequency trigger events, phase trigger events, etc.) may be identified by trigger event analysis subsystem 410. The IEDs detecting coinciding trigger events may be provided to a topology subsystem.

Topology detection subsystem 408 may be configured to determine a topology of an electrical system monitored by multifunction IEDs 424. The multifunction IEDs 424 may be associated with electrical nodes in distinct electrical islands. Using the output of the trigger event analysis subsystem 410, the topology detection subsystem 408 may be configured to identify nodes within an electrical power system that are electrically connected (i.e., are associated with the same electrical island). In various embodiments, topology detection subsystem 408 and trigger event analysis subsystem 410 may be configured to implement method 300, as illustrated in FIG. 3. In one specific embodiment, the topology detection subsystem 408 may be configured to identify a subset of the plurality of nodes at which electrical conditions reflect the first trigger event. The identified nodes may be associated in an electrical island. Each node may be associated with one or more generators or loads.

A power consumption subsystem 414 may be configured to determine the power consumed by a plurality of loads within the electrical system. The power consumed by various loads may be monitored, and changes to the consumption may be communicated to controller 402. As such, power consumption subsystem 414 may monitor dynamic changes to power consumption within the electrical power system.

An electrical balancing subsystem 406 may receive information from topology detection subsystem 408, power consumption subsystem 414, and user adjustable parameters subsystem 404. The electrical balancing subsystem 406 may be configured to use such information to balance electrical generation and consumption in the electrical power system. Balancing the electrical power system may be achieved reducing electrical load, increasing power generation, decreasing power generation, etc. In various embodiments reducing electrical load may be achieved by selectively disconnecting one or more loads, and reducing power generation may comprise selectively disconnecting one or more electrical generators. In a scenario necessitating load shedding, information from user adjustable parameters subsystem 404 may be used to prioritize the shedding of loads. In one specific embodiment, the electrical balancing subsystem 404 may be configured to determine an imbalance between electrical generation and electrical demand in the first island based on a combined inertia of the subset of the plurality of electrical generators and the electrical demand of the subset of the plurality of loads.

A communication subsystem 418 may be configured to communicate with a plurality of other controllers 420, 422 and may exchange information regarding generator inertia, generation capacity, load prioritization, etc. Controllers 420, 422 may represent controllers within the same electrical island and controllers associated with other electrical islands. In some embodiments, information relating to the detection of trigger events may also be communicated among a plurality of controllers. In the event that load shedding is necessary to balance electrical generation and electrical load in an island, controller 402 may communicate with controllers 420, 422 to identify loads to be shed. In some embodiments, the loads to be shed may be determined based on the load priorities provided to user adjustable parameters subsystem 404.

Communication between controller 402 and controllers 420, 422 may be implemented using a variety of types of communication technologies. Such technologies may include wired or wireless communications, and digital or analog communications. In some embodiments, the communication channels between controller 402 and controllers 420, 422 may comprise a low or limited bandwidth channel. In other embodiments, the communications may be enabled by high bandwidth channels.

A control action subsystem 416 may be configured to issue one or more control actions to the multifunction IEDs 424 to balance the electrical system based on an output of the electrical balancing subsystem 406. In some embodiments, the control action subsystem 416 may be configured to select loads or generators to be shed. In some embodiments, a power flow prediction subsystem 419 may be configured to assess an impact of the one or more control actions on a power corridor. In the event that the control action is detrimental to power flow through the power corridor (e.g., the control action would result in power flow exceeding a rated capacity), the control action may be adjusted. In one embodiment, the control action subsystem may be configured to generate a control action operable to eliminate an imbalance between electrical generation and electrical demand based on the combined inertia of the subset of the plurality of electrical generators and the plurality of priority designations associated with the subset of the plurality of loads.

In various embodiments, controller 402 may be implemented using hardware, software, firmware, and/or any combination thereof. Moreover, certain components or functions described herein may be associated with other devices or performed by other devices. The specifically illustrated configuration is merely representative of one embodiment consistent with the present disclosure.

In some embodiments, controller 402 may comprise a processor configured to execute instructions. Such a processor may operate using any number of processing rates and architectures, and may be configured to perform any of the various algorithms and calculations described herein. The processor may be embodied as a general purpose integrated circuit, an application specific integrated circuit, a field-programmable gate array, and/or any other suitable programmable logic device. Instructions to be executed by the processor may be stored in random access memory (RAM).

While specific embodiments and applications of the disclosure have been illustrated and described, it is to be understood that the disclosure is not limited to the precise configurations and components disclosed herein. Accordingly, many changes may be made to the details of the above-described embodiments without departing from the underlying principles of this disclosure. The scope of the present invention should, therefore, be determined only by the following claims.

What is claimed is:

1. A controller configured to balance electrical generation and electrical demand in an electrical power system, the controller comprising:
   a user parameters subsystem configured to receive:
      a plurality of priority designations associated with a plurality of loads; and an inertia of a plurality of electrical generators;
a trigger event analysis subsystem configured to detect a first trigger event based on electrical conditions at a plurality of nodes within the electrical power system, each node comprising an electrical generator;
a topology detection subsystem configured to:
identify a first subset of the plurality of nodes at which electrical conditions reflect the first trigger event;
associate in an electrical island a subset of the plurality of electrical generators and a subset of the plurality of loads based on the first subset of the plurality of nodes at which the operating conditions reflect the first trigger event;
an electrical balancing subsystem configured to determine an imbalance between electrical generation and electrical demand in the first island based on a combined inertia of the subset of the plurality of electrical generators and the electrical demand of the subset of the plurality of loads;
a control action subsystem configured to generate a control action operable to eliminate the imbalance between electrical generation and electrical demand based on the combined inertia of the subset of the plurality of electrical generators and the plurality of priority designations associated with the subset of the plurality of loads.

2. The controller of claim 1, wherein the trigger event comprises a deviation from an operating frequency of the electrical power system.

3. The controller of claim 2, wherein the deviation from the operating frequency comprises one of an under frequency event and an over frequency event.

4. The controller of claim 1, wherein the trigger event comprises a deviation from a phase angle.

5. The controller of claim 1, wherein the trigger event analysis subsystem is further configured to determine that the first trigger event exceeds a predetermined threshold.

6. The controller of claim 1, wherein the trigger detection system is further configured to detect a second trigger event, and wherein the topology detection subsystem is further configured to identify a second subset of the plurality of nodes at which electrical conditions reflect the second trigger event and to associate in the electrical island the nodes in the first subset and the second subset.

7. The controller of claim 1, further comprising a communication subsystem configured to exchange with a plurality of other controllers the priority designation associated with the plurality of loads and the inertia of the plurality of electrical generators.

8. The controller of claim 1, wherein the trigger event analysis subsystem is further configured to receive representations of electrical conditions at the plurality of nodes from a plurality of associated intelligent electronic devices (IEDs).

9. The controller of claim 1, further comprising a power flow prediction subsystem configured to analyze an impact of the control action on a power corridor;
wherein, the control action subsystem is further configured to adjust the control action based on the impact of the control action on the power corridor.

10. The controller of claim 1, wherein the trigger event analysis subsystem is further configured to associate a time with the first trigger event, and the topology detection subsystem is further configured to associate in the electrical island each node at which the operation conditions reflect the first trigger event at the time.

11. The controller of claim 1, further comprising a power consumption subsystem configured to determine an electrical demand of the subset of the plurality of loads associated in the electrical island, and wherein the power consumption is provided to the electrical balancing subsystem.

12. A method for balancing electrical generation and electrical demand in an electrical power system, the method comprising:
receiving a plurality of priority designations associated with a plurality of loads and an inertia of a plurality of electrical generators;
detecting a first trigger event based on electrical conditions at a plurality of nodes within the electrical power system, each node comprising an electrical generator;
identifying a topology of the electrical power system by identifying a subset of the plurality of nodes at which electrical conditions reflect the first trigger event and associating in an electrical island a subset of the plurality of electrical generators and a subset of the plurality of loads based on the subset of the plurality of nodes at which the operating conditions reflect the first trigger event;
determining an imbalance between electrical generation and electrical demand in the first island based on a combined inertia of the subset of the plurality of electrical generators and the electrical demand of the subset of the plurality of loads;
generating a control action operable to eliminate the imbalance between electrical generation and electrical demand based on the combined inertia of the subset of the plurality of electrical generators and the plurality of priority designations associated with the subset of the plurality of loads.

13. The method of claim 12, wherein the trigger event comprises a deviation from an operating frequency of the electrical power system.

14. The method of claim 12, wherein the trigger event comprises a deviation from a phase angle.

15. The method of claim 12, further comprising:
detecting a second trigger event;
identifying a second subset of the plurality of nodes at which electrical conditions reflect the second trigger event; and
associating in the electrical island the nodes in the first subset and the second subset.

16. The method of claim 12, further comprising:
exchanging the priority designation associated with the plurality of loads and the inertia of the plurality of electrical generators with a plurality of other controllers.

17. The method of claim 12, further comprising:
receiving representations of electrical conditions at the plurality of nodes from a plurality of associated intelligent electronic devices (IEDs).

18. The method of claim 12, further comprising:
analyzing an impact of the control action on a power corridor; and
adjusting the control action based on the impact of the control action on the power corridor.

19. The method of claim 12, further comprising:
associating a time with the first trigger event,
associating in the electrical island each node at which the operation conditions reflect the first trigger event at the time.

20. The method of claim 12, further comprising determining an electrical demand of the subset of the plurality of loads associated in the electrical island, and wherein the power consumption is provided to the electrical balancing subsystem.

\* \* \* \* \*